March 15, 1966 M. M. BIRNBAUM ETAL 3,240,942

APPARATUS FOR ESTABLISHING AND MAINTAINING A PREDETERMINED ANGULAR RELATION TO A SOURCE OF RADIANT ENERGY

Filed March 14, 1962 9 Sheets-Sheet 1

Image Dissector & Vidicon disclosed column 5

INVENTORS
MORRIS M. BIRNBAUM
PHIL M. SALOMON
BY

United States Patent Office 3,240,942 Patented Mar. 15, 1966

3,240,942

APPARATUS FOR ESTABLISHING AND MAINTAINING A PREDETERMINED ANGULAR RELATION TO A SOURCE OF RADIANT ENERGY

Morris M. Birnbaum, Pasadena, and Phil M. Salomon, Sunland, Calif., assignors to General Precision, Inc., a corporation of Delaware Filed Mar. 14, 1962, Ser. No. 179,616
9 Claims. (Cl. 250—203)

The present invention relates to apparatus of the type devised to find and follow automatically a radiating or reflecting source of energy and maintain a predetermined position relative thereto.

Apparatus of this type may be employed in observatories to maintain telescopes in alignment with a luminous objective irrespective of the movement of the earth, or in outer space to maintain an axis of a space vehicle in alignment with, or in a predetermined position relative to, a celestial body so that the vehicle may adhere to a predetermined course in space or may maintain a predetermined position irrespective of its orbital movement about the earth.

Such apparatus employ usually a photo electric tube that has a photo sensitive cathode upon which is imaged a field of view and which emits a stream of electrons from each point upon which radiation from a source of energy is focussed. The stream of electrons thus produced is directed onto a succession of dynodes which amplify said stream to an extent wherein the tube supplies a significant output current even if the intensity of the radiation impinging upon its photo sensitive cathode is extremely small. When such tubes are employed in tracking apparatus of the type referred to, a so-called image dissecting plate having a centrally located aperture is placed between the first dynode of the tube and its photo cathode, with the aperture centered upon the optical axis of the lens system. Tubes of this type are known as Image Dissector Tubes and are provided with electron stream deflection means, such as a magnetic deflection yoke, to deflect the electron stream emitted by the cathode in a predetermined pattern across the aperture of said plate, causing the tube to supply an output current as long as the deflected electron stream remains within the aperture of said plate. When the stream of electrons passes over the plate itself and is blocked by said plate from reaching the dynodes of the tube, however, current flow ceases, and reappears only when the stream of electrons in following its deflection course re-enters said aperture. The resultant current pulses in the output stage of the tube are indicative of the location of the undeflected axis of the electron stream in the aperture of the image dissector plate and hence of the point of impingement of focussed rays of radiant energy upon the photo cathode of the tube, and may be employed to indicate any departure of said point from a predetermined position uopn said cathode. If the deflection pattern of the electron stream is symmetrical, for instance, if it is a straight sweep of equal amplitude to the right and to the left of a steady state axis, the period of time during which the electron stream emitted by the photo cathode may reach the first dynode and produce a current output when sweeping to the right is equal to the period of time during which the stream may reach the first dynode when sweeping to the left, only as long as the steady state axis of the stream passes through the center point of the aperture. Hence, current pulses of identical duration produced by the tube when the stream is swept to the right and to the left are indicative of the fact that the steady state axis of the electron stream passes through the center point of a predetermined diameter of the aperture. On the other hand, if the current pulse is of longer duration when the electron stream is swept to the right and is of shorter duration when the stream is swept to the left, the steady state axis of the electron beam is obviously displaced to the left of the center point of the aperture to an extent indicated by the difference in the duration of the current pulses supplied by the tube. By deflecting the stream from its initial course to and fro along a plurality of angularly displaced diameters of the aperture, such as for instance along the abscissa and ordinate of a Cartesian system, the tube can be made to supply current pulses that are indicative of the location of the electron stream in the aperture of the plate and which may be employed to discover any departure of the point of impingement of the focussed radiant energy from the optical axis of the apparatus.

Similar output currents can be obtained from systems employing camera tubes other than the described image dissector tube, such as Vidicon type tubes.

It is an object of the invention to provide a simple, effective, and dependably operating arrangement for analyzing the output pulses of an apparatus of the type referred to, with a view toward determining any departure of the point of impingement of focussed radiant energy from the optical axis of the apparatus.

Another object of the present invention is to provide a simple and effective arrangement for correlating the output pulses of an apparatus of the type referred to, with the corresponding sectors of the deflection pattern of the electron stream.

Referring again specifically to apparatus employing image dissector tubes, in sensing departures of a point of focussed radiant energy from the optical axis of the apparatus, it is essential that the stream of electrons released by the photo cathode be directed through the aperture in the center of the image dissector plate. This is rarely, if ever the case, when the apparatus is first pointed at a ditsant source of radiant energy. It occurs only when the optical axis of the tube is in precise alignment with the distant target. It is therefore usually necessary when employing an apparatus of the type here under consideration, to adjust its position until the required degree of alignment is established, before the the departure sensing operations may be initiated.

It is yet another object of our invention to render such preliminary physical alignment operations unnecessary in apparatus of the type here under consideration.

More particularly it is an object of the invention to provide means for scanning the photo cathode of tracking apparatus of the type employing image dissector tubes, which is effective to direct any electron stream which it may encounter into the aperture of the image dissector plate.

It is a particular object of the invention to provide an arrangement of the type referred to, which directs any electron beam released by the photo cathode in response to impingement thereof by focussed radiant energy from a distant source into the aperture of the image dissector plate without physically changing the position of the tube, and which initiates the actual departure sensing operations whenever this has been accomplished.

In this connection it is yet another object of our invention to provide a simple and effective arrangement for sweeping an electron beam or stream in a spiral pattern across a target surface.

Space vehicles may be sent to distant targets in space that do not contain sources of radiant energy or which do not reflect sufficient energy to be used as a target. To constrain such vehicles to their intended course, it may be necessary to confine them to a course that departs from an available target by a predetermined angle.

It is a further object of the invention therefore to provide an apparatus, of the type referred to, which is adapted to find a distant source of radiant and reflected energy which departs from a desired direction by a predetermined angle, and which is operative to maintain said angle between its course of movement and said source.

In the past, when the output of tracking apparatus of the type here under consideration, indicated a departure thereof from alignment with a selected distant source of radiant or reflected energy, it was necessary to re-adjust the physical position of the apparatus with the aid of servo mechanisms to maintain an operative relationship with the target.

It is an important object of our invention to provide a tracking apparatus which maintains automatically an operative relationship with a selected source of radiant or reflected energy irrespective of changes in its position and/or in the position and location of the target, without changing the physical position of the apparatus.

Still another object of the invention is to provide a tracking apparatus, of the type referred to, that may selectively be set to change from one to another target, without changing its physical position.

These and other objects of the present invention will be apparent from the following description of the accompanying drawings which illustrate a preferred embodiment thereof, and wherein.

Figure 8:
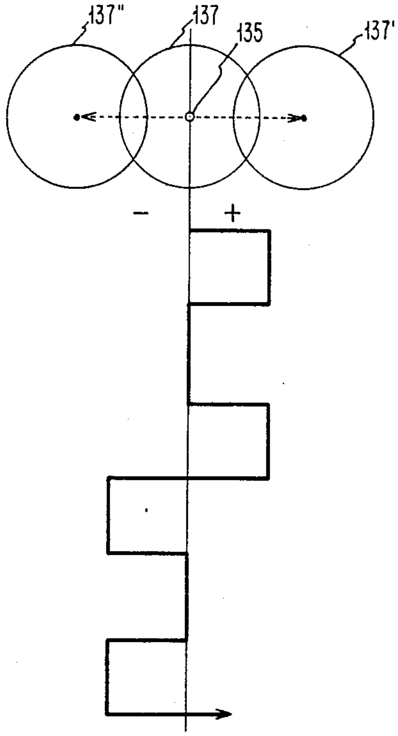
Figure 9:
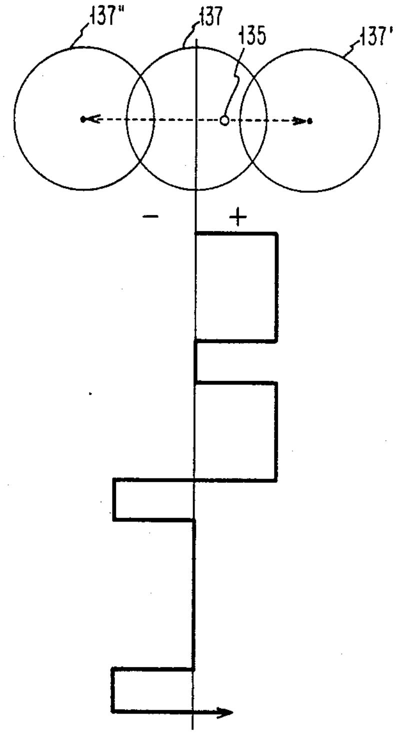

FIGURE 8 is a diagram illustrating the manner in which an electron beam may be swept across an image focussed upon the photo-sensitive layer of a Vidicon tube, and representing a condition wherein the steady state axis of the beam is in precise alignment with the image; and FIGURE 9 is a diagram similar to FIGURE 8 representing a condition wherein the image is displaced from alignment with the steady state axis of the electron beam.

Figure 1:
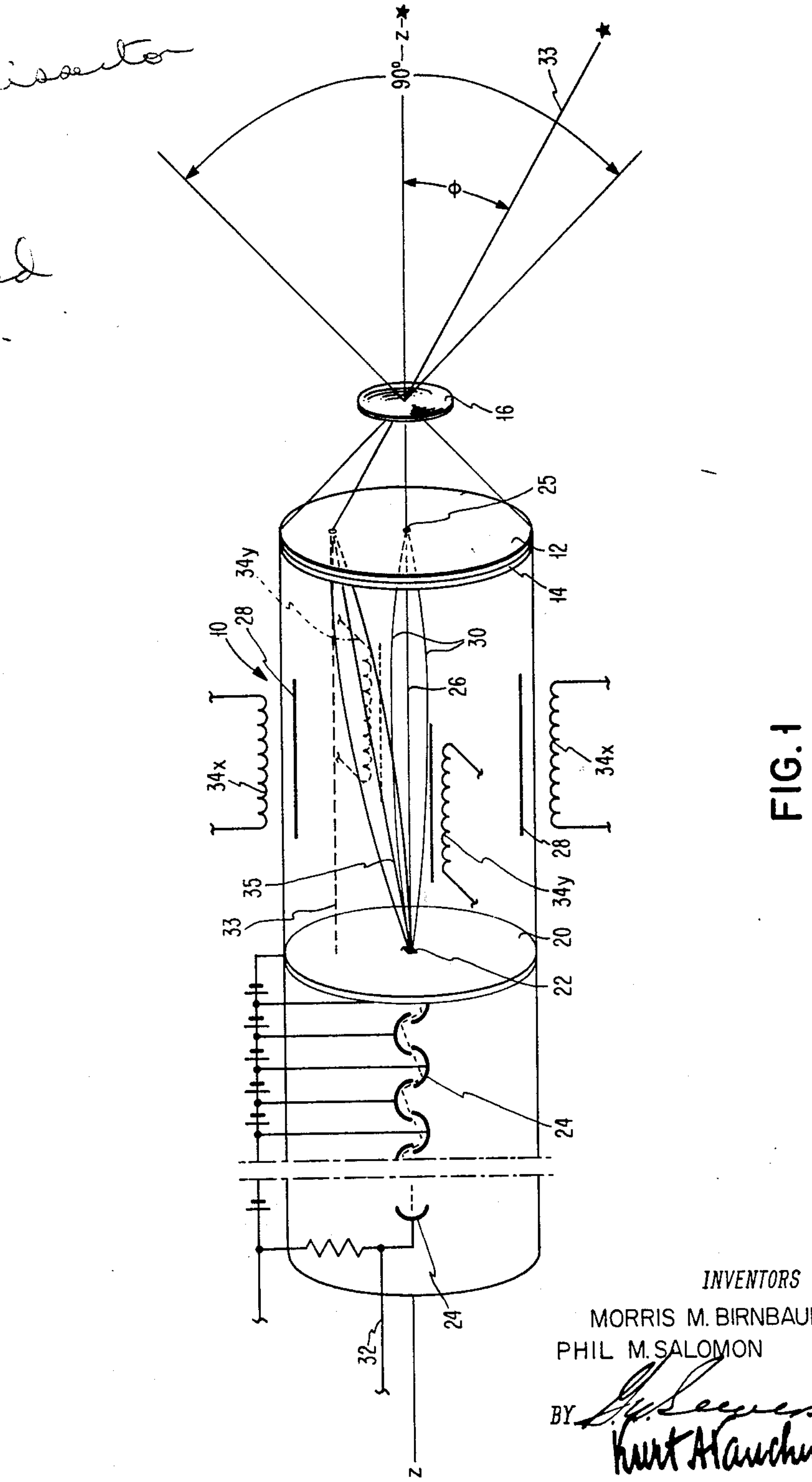
FIGURE 1 is a schematic cross section of a particular type of a photo multiplier tube which is known as an Image Dissector Tube and may form part of the apparatus of our invention.

The tube illustrated in FIGURE 1 is a photo multiplier tube which is marketed by I.T. & T. Laboratories under the name "Image Dissector Tube" and is identified by the characters FW 146. It comprises a tubular enclosure 10, the front end of which is covered by a translucent plate-shaped cathode 12 of substantial diameter whose inner surface is coated with a layer 14 of photosensitive material. Disposed in front of said cathode is a viewing lens 16 which is arranged to focus any luminous object within a suitable field of view, say of 90°, on the cathode 12. In practical operation the tube is energized from a source of high voltage represented by the blocks 18 in FIGURES 2A, 2B, 2C and 2D, and when the cathode 12 is impinged upon by a beam of light, the stream of electrons emitted by the photo-sensitive layer 14 is projected into the interior of the enclosure. Located within the tubular enclosure is an image dissector plate 20 which is provided with a central aperture 22, and arranged behind said plate is an array of consecutive dynodes 24. If the optical axis $z—z$ of the apparatus points to, and is aligned with a distant source of radiations, such as a star, the focussed energy from said distant source impinges upon the center area of the cathode 12, and the stream of electrons emitted by the photo-sensitive layer 14 of said cathode passes through the center of aperture 22 of plate 20 onto the first dynode of the array of dynodes 24 as indicated by the line 26; and means are provided in the form of a focussing cylinder indicated at 28 or focussing coils (not shown) to focus said stream into the aperture 22 as indicated by the arcs 30. The dynodes 24 receive, and increase, the stream of electrons by secondary emission in a manner well known in the art of multiplier tubes so that a substantial output current appears in the output terminal 32 of the tube in response to the most minute amounts of focussed energy directed against its cathode 12.

In practice, however, when a photo tube of the type described is pointed at a star or other distant source of radiant or reflected energy, its axis will rarely, if ever, be precisely aligned with the target so that the lens 16 focusses the light received from the target on some point of the cathode that it radially removed from the center thereof, and the stream of electrons emitted from the cathode in the area opposite said point will therefore reach the image dissector plate 20 in areas other than the central aperture 22 thereof, such as represented by the broken line 33 in FIGURE 1.

In accordance with the invention we provide means effective to direct the stream of electrons emitted by the photo-cathode in response to impingement by focussed radiant energy of a predetermined intensity within the field of view of the lens, into the aperture 22 of the image dissector plate 20, without need to change the physical position of the instrument. Thus, the instrument need not be pointed precisely at the distant target, and the tracking operations which may be intended to maintain the instrument in a predetermined position relative to the distant target may commence without the need for adjustments in the physical position of the instrument. For this purpose we provide means which establish periodically varying deflection fields capable of directing, during each cycle of variation, any stream of electrons emitted by the cathode into the aperture of the image dissector plate 20 no matter where its point of origin may be located upon the cathode surface. Thus, potentials may be applied to the deflection-field producing means which would cause an electron stream emitted from its center point to trace an expanding and/or collapsing spiral upon the plate 20. This has the converse effect of establishing a continuous sequence of field configurations that include at least one field configuration which is effective to direct an electron stream into the aperture 22 of image dissector plate 20 for each potential point of origin of such a stream on the electron emissive layer of the cathode. Thus, the periodically varying deflection fields established in accordance with our invention may be regarded as searching the inner surface of the cathode along a spiral path for an electron stream to direct it into the aperture 22; and when any such stream has been found, and has been directed into said aperture, means are set into operation by the resultant appearance of a voltage in the output line 32 of the tube, which "freeze" the momentary condition of energization of said deflection field producing means and thus preserve a deflection field pattern that directs the "discovered" electron stream through the aperture 22 in the sensing plate 20. When this has been accomplished, the instrument is ready to perform tracking operations that sense any departure of its optical axis *z—z* from its momentary position relative to the target whose radiant or reflected energy initiated the emission of electrons from the cathode of the instrument, whether any such departure is due to changes in the position of the instrument or the source of energy or both.

Figure 2A:
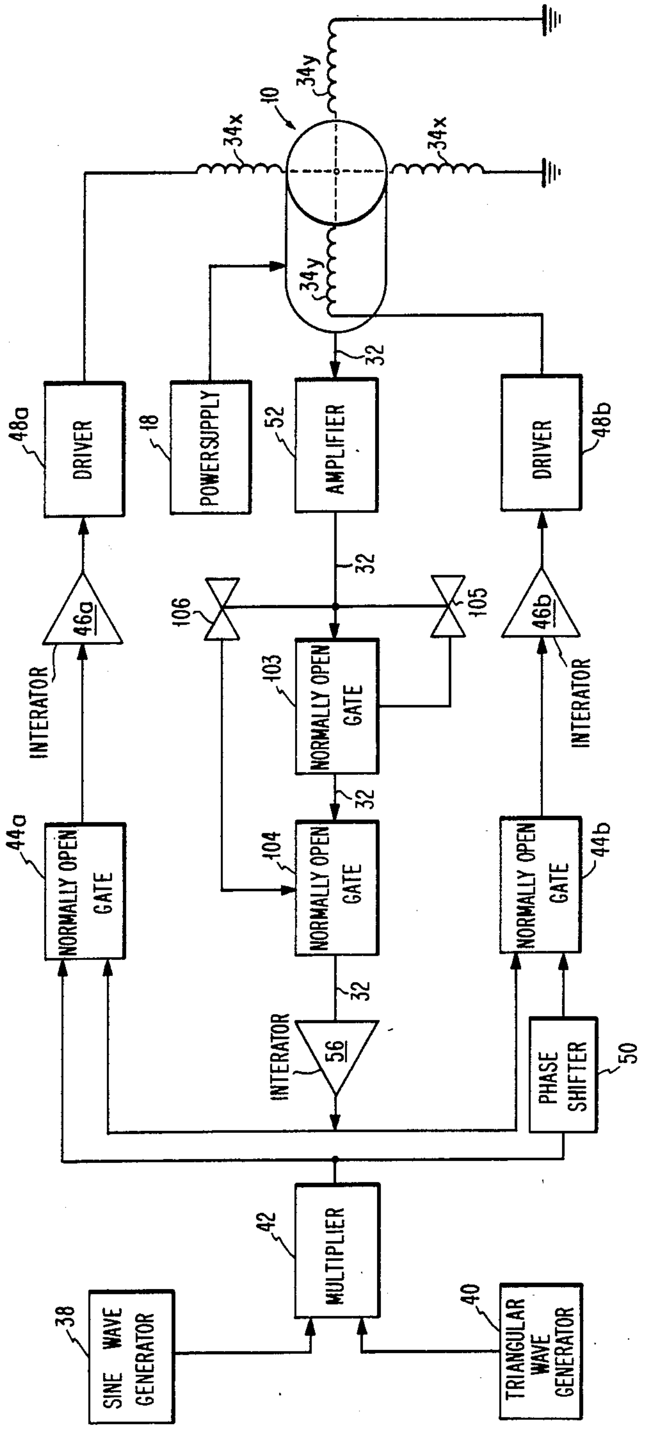
FIGURES 2A, 2B, 2C and 2D are block diagrams illustrating different portions of an arrangement embodying our invention.

Having reference to FIGURES 1 and 2A, supported around the image dissector tube 10 in the area between cathode 12 and the image dissector plate 20 are pairs of oppositely positioned deflection coils 34*x* and 34*y*, and we apply to said coils varying currents that establish a periodically varying field configuration which would cause an electron beam emitted from the center point of the cathode to trace an alternately expanding and contracting spiral upon the plate 20.

In the Cartesian system a spiral is represented by the two functions:

$$(1)\ X=K\cos\theta$$

$$(2)\ Y=K\sin\theta$$

wherein K is an alternately lineally increasing and decreasing factor. To deflect an electron beam in an alternately expanding and collapsing spiral pattern, we therefore multiply the output of a sine wave generator with the output of a triangular wave generator, both of which are well known in the art; and we apply part of the resultant products to one set of deflection coils while the other part is passed through a phase shift network to convert it into a cosine signal and is then applied to the second set of deflection coils as diagrammatically illustrated in FIGURE 2A. In said FIGURE 2A the block 38 represents a sine wave generator set to generate the signal sin $\theta$ and the block 40 represents a triangular wave generator. The outputs of said generators are applied to an analogue multiplier represented by the block 42 which may be of the type described in U.S. patent application Serial Number 121,720 of Morris Birnbaum and William J. Wichmann filed on July 3, 1961. Part of the output of multiplier 42 is applied directly to the deflection coils 34*x* through a normally open control gate 44*a*, an integrator 46*a* and a driver stage 48*a*, while another part of the output of said multiplier 42 is first passed through a phase shift network represented by the block 50 and is then applied to the deflection coils 34*y* through a normally open control gate 44*b*, an integrator 46*b*, and a driver stage 48*b*. When the outputs of multiplier 42, and of multiplier 42 and phase shift network 50, respectively reach the coils 34*x* and 34*y*, fields are set up in the space of tube 10 between the cathode 12 and the image dissector plate 20 thereof that sweep any electron stream emitted by the cathode in a spiral pattern over the image dissector plate 20 until it hits, and passes through, the aperture 22 in said plate. When this occurs and the electron stream reaches the first dynode 24 of the tube, a voltage appears in the output line 32 thereof. Such output voltage is amplified in an amplifier represented by the block 52, and is applied to both the hereinbefore mentioned normally open gates 44*a* and 44*b* to close said gates so that the spiral sweep producing voltages generated by generators 38 and 40 in combination with multiplier 42 and phase shift network 50, respectively, can no longer reach the deflection coils 34*x* and 34*y*, and variation of the spiral sweep establishing magnetic fields in the tube comes to a halt. A suitable integrator represented by the triangle 56 in FIGURE 2A may be placed into the output line 32 to prevent that spurious voltages appearing in said output line in response to stray illumination of the photo cathode 12 may close the gates and thus prematurely terminate the target searching variation of the deflection fields.

Whenever the gates 44*a* and 44*b* are closed, the charges stored at the moment in the hereinbefore mentioned integrators 46*a* and 46*b* are effective to hold the currents in coils 34*x* and 34*y* respectively at the same magnitudes which they possessed at the instant when the first significant output appeared in line 32, and which were instrumental in directing the "discovered" electron stream into the aperture 22 of image dissector plate 20. This has the effect that the stream of electrons emitted from the cathode of tube 10 in response to energy impingement from a distant target remains in a fixed condition of deflection along axis 35 wherein it passes through the aperture 22 of image dissector plate 20. Thus, the instrument has acquired a target without any change in its physical position and the tracking operations which are to maintain it in operative relation to said target may now commence as if the optical axis of the instrument were aligned with the target.

For dependable operation of the described arrangement, it is important that the integrators 46*a* and 46*b* in the sweep voltage supply lines be of such construction that they preserve for a significant period of time the charges which they possess at the moment the gates 44*a* and 44*b* are closed, thus defining and fixing axis 35. We have found that operational integrators known in the trade by the letters K*a*–X will perform satisfactorily in this manner.

The instrument has now acquired a reference point in space, which may be a preselected star at which it may have been roughly pointed. Means may now enter into operation which sense any departure of the instrument from its desired position relative to said reference point and which develop error voltages, if any departure from said position should occur, that may be employed to indicate the existence and extent of such a departure and/or to set mechanisms into operation that re-establish said predetermined position, or effect such changes in the deflection of the electron stream as will maintain an operative relation between the instrument and the acquired reference point.

Figure 3:
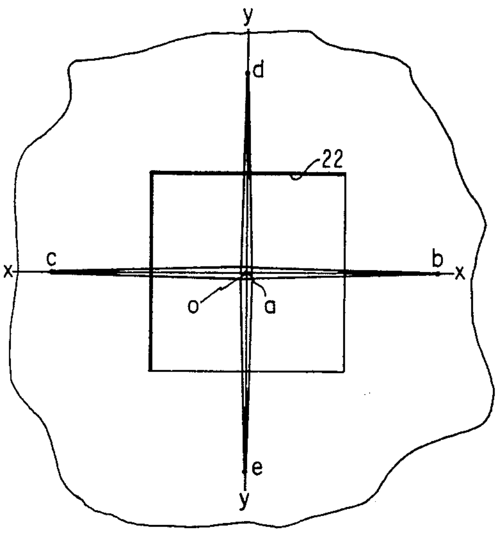
FIGURE 3 is a diagram illustrating the pattern along which a radiant energy generated electron stream may be swept across an apertured image dissector plate in a tube of the type illustrated in FIGURE 1 and representing a condition wherein the steady state axis of the stream is in precise alignment with the center point of the aperture in the plate.
Figure 4:
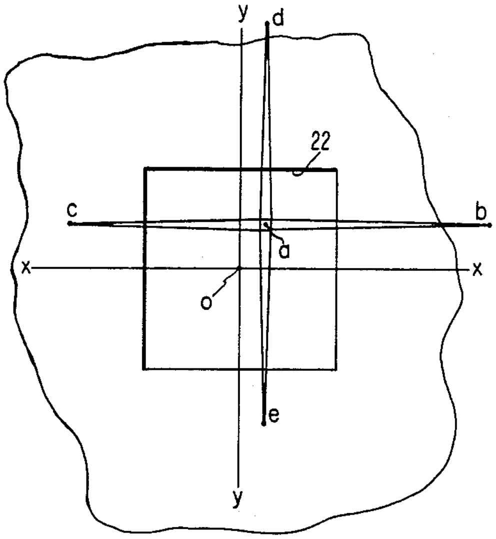
FIGURE 4 is a diagram similar to FIGURE 3 illustrating a condition wherein the steady state axis of the electron stream is displaced from the center point of the image dissector plate.

For this purpose the electron stream emitted from the cathode of the tube and directed into the aperture 22 of image dissector plate 20 by the constant currents passing through coils 34*x* and 34*y* is swept across and beyond said aperture along diameters thereof corresponding to the abscissa and ordinate of a Cartesian system. This is accomplished by the application of alternating currents to coils 34*x* and 34*y*, which are superimposed upon the constant currents that pass through said coils at the moment, or by the application of alternating currents to an auxiliary set of coils placed adjacent coils 34*x* and 34*y*, respectively. In this manner it is possible to obtain accurate information into which of the four quadrants of the aperture 22 the beam may shift due to changes in the position of the instrument (or of the vehicle upon which it is supported), and/or in the position of the reference target. For instance, means may be provided to deflect the electron stream in an endless sequence from the axis determined by the constant currents in coils 34*x* and 34*y* (*a*) to the right (*b*), back to the axis (*a*), to the left by an equal distance (*c*), back to the axis (*a*), upwardly by an equal distance (*d*), back to the axis (*a*), downwardly by an equal distance (*e*) and back to the axis (*a*), from there to begin a new cycle commencing with a deflection to the right. FIGURE 3 illustrates such a sweep pattern, and shows the radial excursions of the stream in its four main directions as slightly divergent so that they may be clearly discerned. FIGURE 3 represents a situation wherein the axis *a* of the electron stream passes through the center *o* of the aperture 22 which is shown to be of square shape. FIGURE 4, on the other hand, illustrates a situation wherein the axis of the electron beam is somewhat displaced to the right and upwardly of the center *o* of the aperture 22, which indicates that the instrument has departed from its predetermined position relative to the distant reference point and requires reorientation.

To sweep the electron stream in the described manner across aperture 22, the tube 10 may be provided with separate deflection elements as pointed out hereinbefore, or the proper deflection voltages may be applied to the hereinbefore described deflection coils 34*x* and 34*y* to be superimposed upon the constant currents which are passed through said coils in the manner described hereinbefore to direct the electron stream through the aperture 22. In the embodiment of the invention illustrated in FIGURES 2A, 2B and 2D, the same deflection coils 34*x* and 34*y* do not only serve to find and maintain a reference point in space, they also serve to ascertain and compensate for departure of the instrument from a predetermined position relative to said reference point.

For the electron stream emitted from the cathode 12 to be deflected in the manner illustrated in FIGURES 3 and 4, it is necessary that a positive-going triangular wave followed by a negative-going triangular wave be first delivered to the coils 34*x* which deflect the stream along the *x*-axis, and that a positive-going triangular wave followed by a negative-going triangular wave be then delivered to the coils 34*y* which deflect the beam along the *y*-axis.

Figure 2B:
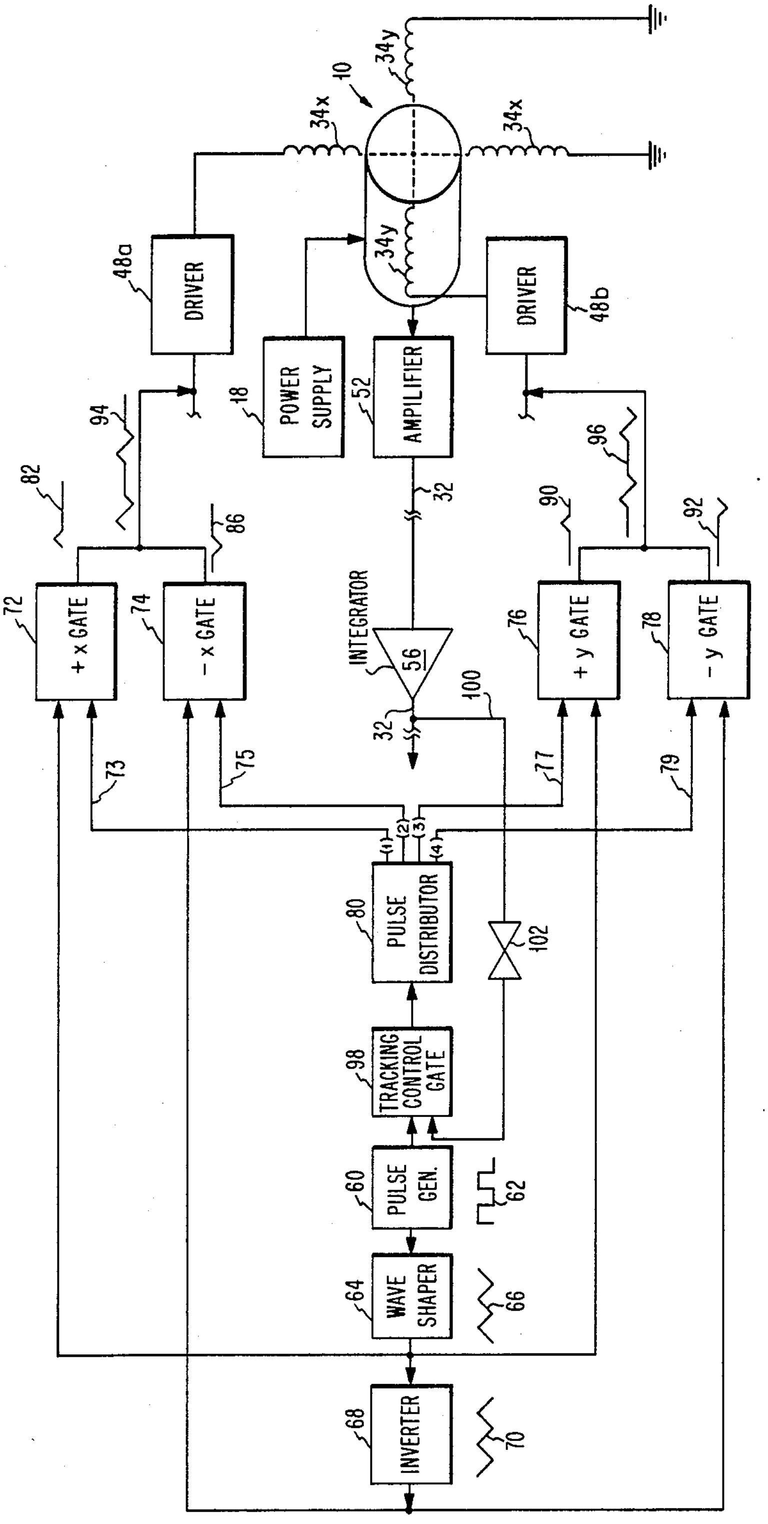
Figure 2C:
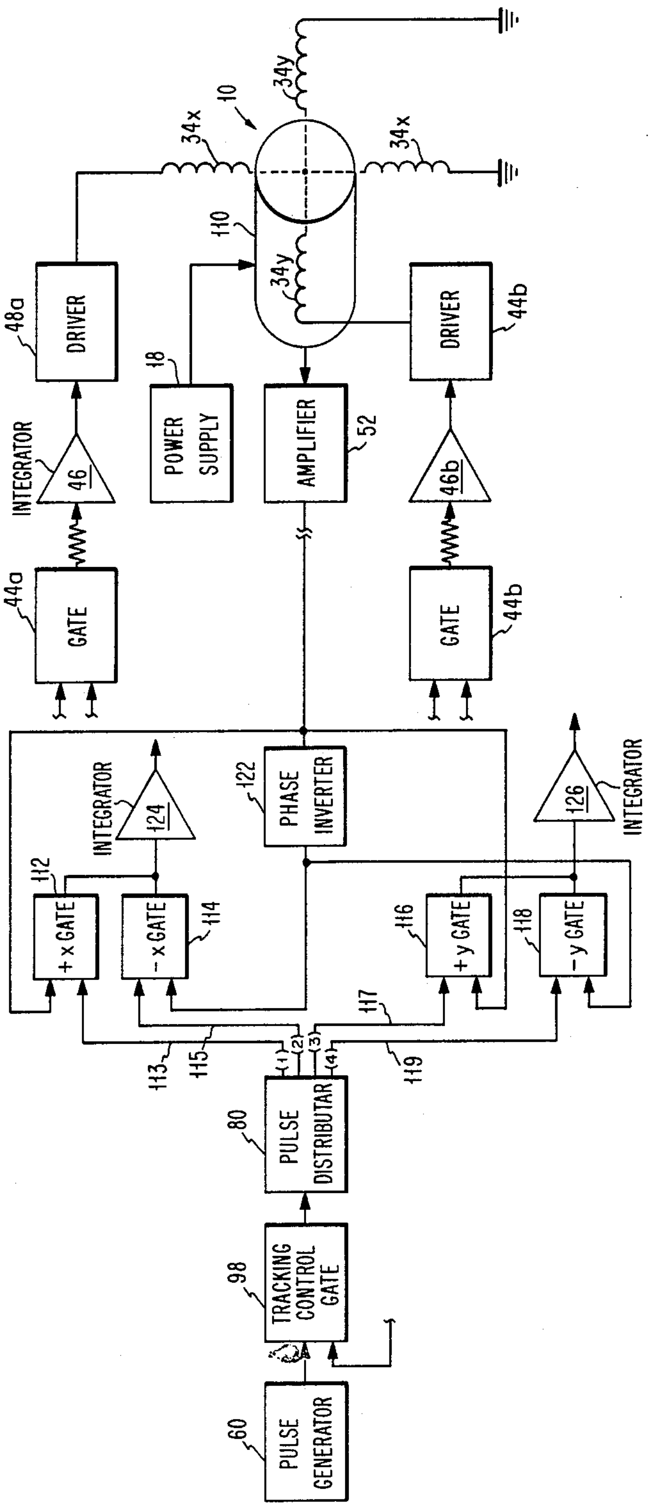
Figure 5:
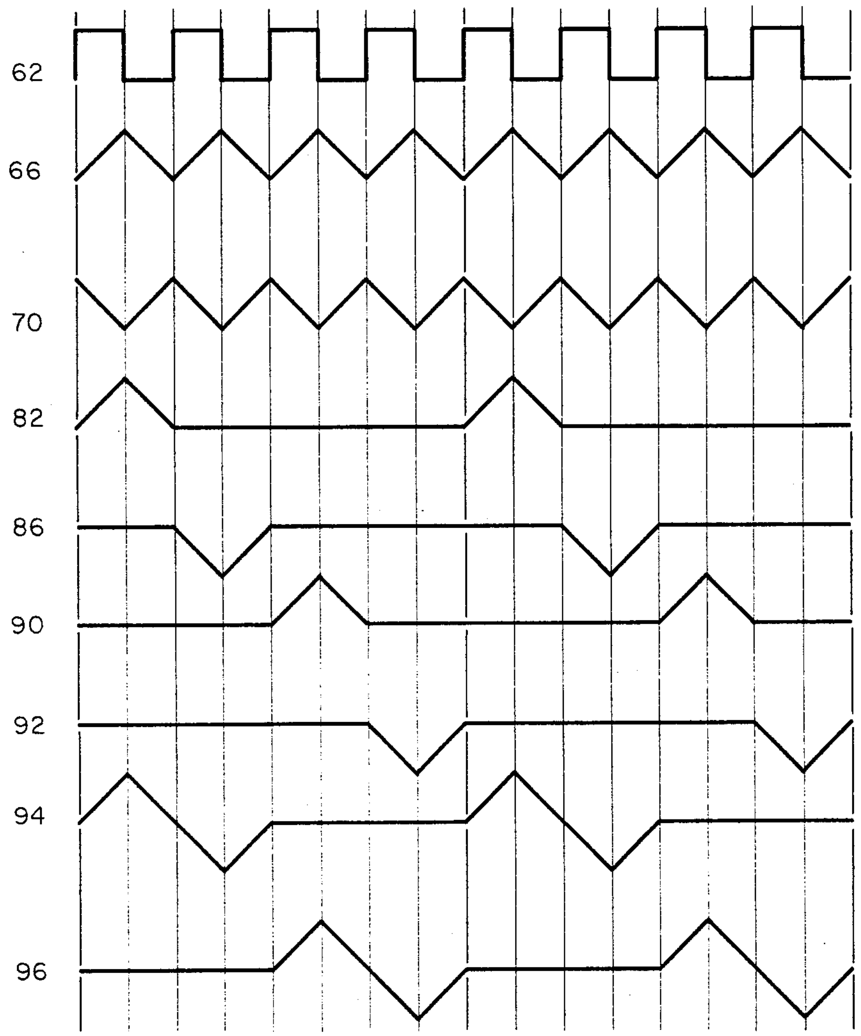
FIGURE 5 illustrates the signal pulses employed to deflect the electron stream emitted by the photo cathode of the image dissector tube, in the manner illustrated in FIGURES 3 and 4.

In the exemplary embodiment of the invention that we are about to describe and which is diagrammatically illustrated in FIGURES 2A, 2B and 2C of the accompanying drawings, the deflection signals employed in the apparatus of our invention are supplied by a continuously operating pulse generator represented by the block 60 (FIGURE 2B) which may be adjusted to generate, say, 800 square wave pulses per second, as illustrated at 62 in FIGURES 2B and 5. In suitable circuitry indicated by the block 64, these square wave pulses are converted in a conventional manner into triangular waves, such as illustrated at 66. Part of the output of the wave-shaping circuitry 64 is inverted in a phase shift network represented by the block 68 to form a signal of identical shape but opposite polarity which is indicated at 70; and the triangular signals 66 and 70 of opposite polarity now available are applied to the deflection coils 34*x* and 34*y* of the image dissector tube through timing gates 72, 74, 76 and 78 which permit said signals to reach said coils only at the proper time and in the proper sequence so as to produce periodically varying magnetic fields that will deflect any electron stream generated by the photo cathode of the tube in the manner illustrated in FIGURES 3 and 4.

For this purpose the unchanged output of wave-shaping circuitry 64 is applied to gate 72, which is an "and" gate that passes signals only when a second signal is simultaneously applied to it. Said gate 72 is to pass only the first triangular wave of every set of four triangular waves produced by wave shaper 64 and to this end a pulse distribution network represented by the block 80, is arranged to transmit the first pulse of every group of four pulses produced by generator 60 through line 73 directly to the gate 72 as the necessary gate-opening pulse. Thus, the signal emerging from gate 72 has the shape illustrated at 82 in FIGURES 2B and 5. This signal is applied to the coils 34*x* through the hereinbefore described driver stage represented by the block 48*a* and is effective to deflect the electron stream along path *a–b–a* of FIGURE 3, with the first of every group of four pulses generated by pulse generator 60.

The inverted output of wave shaping circuitry 64 is applied to the "And" gate 74 which is controlled by the pulse distributing network 80 through line 75 to pass only the second triangular wave of every group of four triangular waves pulses supplied by wave shaper 64. Hence, the signal emerging from gate 74 has the form shown at 86 in FIGURES 2B and 5. Said signal is also applied to the coils 34*x* through driver stage 48*a* and is effective to force the electron stream along path *a–c–a* of FIGURE 3, with each second pulse of every group of four pulses produced by pulse generator 60.

The unchanged output of wave shaping circuitry 64 is also applied to the "And" gate 76 which is controlled from pulse distributor network 80 through line 77 to pass only every third triangular wave of each group of four triangular waves and which is arranged to deliver its output through driver stage 48*b* to the deflection coils 34*y*. Hence, gate 76 delivers the signal illustrated at 90 in FIGURES 2B and 5 to the coils 34*y*, which is effective to deflect the electron stream with every third pulse of each group of four pulses of generator 60 along path *a–d–a* of FIGURE 3. Finally, the inverted output of wave shaping circuitry 64 is also applied to the "And" gate 78 which is controlled from pulse distributor network 80 through line 79 to pass only every fourth triangular wave of each group of four triangular waves supplied by wave shaper 64. The signal appearing at the output side of gate 78 has, therefore, the form illustrated at 92 in FIGURES 2B and 5. It is delivered through driver stage 48*b* to the same coils 34*y* as the output signal of gate 76 and is effective to deflect an electron stream emitted from the photo cathode of tube 10 along path *a–e–a* of FIGURE 3. The composite signals applied to the coils 34*x* and 34*y* of tube 10 through gates 72, 74, 76 and 78, respectively, are illustrated at 94 and 96 in FIGURES 2B and 5 and are effective to deflect an electron stream emitted by the cathode of tube 10 continually in the manner illustrated in FIGURES 3 and 4.

To prevent commencement of the described operations until the instrument has acquired a reference point in space, a normally closed "And" gate is interposed between the pulse generator 60 and the pulse distributor network 80, as indicated by the block 98 in FIGURE 2B. As long as said gate is closed, the pulse distributing network 80 is unable to deliver gate-opening pulses to the scanning gates 72, 74, 76 and 78, but when a significant output appears in line 32 of the image dissector tube 10 indicating that the instrument has found, and locked onto, a target, the output of integrator 56 is delivered to the gate 98 through a line 100 to open said gate. The current pulses produced in generator 60 may now reach the pulse distributing network 80, and the described tracking operations may commence. To prevent premature initiation of the tracking operations in response to the appearance of spurious voltages in the output line 32 of tube 10, and to insure an even and uninterrupted performance once they have started, a flip-flop trigger may be interposed between the scanning control gate 98 and integrator 56 as indicated at 102 in FIGURE 2B.

Interposed in line 32 may be circuitry which measures the energy intensity of an acquired target by means of the magnitude of the output pulses in line 32 and which permits opening pulses in said line to reach the search control gates 44*a* and 44*b* (FIGURE 2A) and the tracking control gate 98 (FIGURE 2B) only if the energy intensity of the acquired target exceeds a predetermined minimum. In this manner the instrument is prevented from acquiring as a reference target an object of potentially inadequate energy intensity, for instance a star whose light intensity is too weak to insure proper performance. In its simplest form such energy intensity measuring circuitry may be formed by a simple threshold circuit such as a Schmitt trigger placed into line 32. If it is desired, however, to achieve acquisition, by the instrument, of objects of a selected energy intensity to enable the instrument, for instance, to choose a predetermined star among several stars of adequate light intensity within the field of vision of lens 16, more complex circuitry is necessary such as represented by the symbols 103, 104, 105 and 106 in FIGURE 2A. The block 103 represents a normally closed gate in output line 32 and the symbol 105 a trigger, such as a flip-flop that becomes conductive when a predetermined minimum voltage is applied to it. The block 104 represents a normally open gate in the output line 32 in series with gate 103 and the symbol 106 represents another flip-flop that becomes conductive when a predetermined minimum voltage is applied to it, which is higher than the minimum voltage to which the trigger 105 responds. The trigger 105 is arranged to deliver opening pulses to the normally closed gate 103, whenever it becomes conductive, and the trigger 106 is arranged to deliver closing pulses to the normally open gate 104 whenever it becomes conductive. Hence, the target searching operations cannot be terminated and the target tracking operations cannot commence, until the instrument encounters a star of sufficient light intensity to produce in line 32 the minimum voltage required to operate the trigger 105. On the other hand, when the instrument encounters a target of such light intensity as to produce in the output line 32 a voltage that operates the trigger 106, the gate 104 closes, so that the target tracking operations are unable to commence, and the target searching operations may continue.

Thus, the instrument will acquire only targets of such energy intensities as lie within the range defined by the voltage to which the triggers 105 and 106 respond.

When the instrument has acquired a reference point in space, the target searching operations cease as pointed out hereinbefore and the tracking operations commence to maintain the instrument in operative relation with the reference point. Now a current appears in the output line 32 of the tube as long as the electron stream emitted by the cathode 12 passes through the aperture 20 in the image dissector plate 22 as it is swept across and beyond said aperture in the pattern illustrated in FIGURES 3 and 4.

As long as the permanent deflection currents passed through the coils 34$x$ and 34$y$ by integrators 46$a$ and 46$b$, respectively, direct the center axis of the electron stream precisely through the center point of aperture 22 (which means that the instrument maintains its predetermined position relative to the distant reference point), the successive current pulses appearing in output line 32 are of equal duration and so are the intervals between current flow; but when the center axis of the electron stream is displaced from the center point of aperture 22 in one or the other direction, as illustrated in FIGURE 4, the current pulses produced when the stream is swept across opposite sectors of the aperture 22 are unequal and so are the intervals between current flow. The pulses appearing in the output line 32 of the image dissector tube, therefore, contain in terms of relative duration the information whether the electron stream emitted by the cathode in response to impingement of light from the distant reference target passes through the geometrical center point of the aperture 22 (which indicates that the instrument is in its proper position relative to the distant reference target) and if it is not, in which direction and how far the axis of the electron stream is displaced from the center point of the aperture 22 which indicates in which direction and by which angle the optical axis of the instrument is displaced from its initial position relative to the reference point. In accordance with the invention, we provide a simple, dependable and exceedingly sensitive arrangement for interpreting the output of the image dissector tube and for indicating clearly whether the instrument is in its proper position relative to the reference point, and if not, in which direction and to which extent it departs from its proper orientation relative to said point. Moreover, in accordance with the invention we employ any "error" signals obtained from this interpreting arrangement for compensating for the deviations in the position of the electron stream, which develop as a result of changes in the relative position of the instrument and the acquired target, with a view to maintaining the instrument and the acquired target in operative relation with each other. For this purpose we use the "error" voltages to set up such force fields as will continually readjust the steady state deflection of the electron stream so that it will always return to a position wherein its center axis passes through the center point of the aperture in plate 20; in other words, we establish a servo arrangement that maintains the instrument in operative relation with the acquired target, without subjecting it to any mechanical movement.

To interpret the output of the image dissector tube we separate the output pulses into phases corresponding to the radial excursions of the electron stream as it is swept across the apertured plate 20 through the action of the deflection coils 34$x$ and 34$y$ depending on the directions in which the stream travels. For this purpose we deliver said output simultaneously to four parallel gates 112, 114, 116 and 118 which are briefly opened in succession by pulses that may be derived from the same pulse distributing network 80 that controls the application of the deflection-field-establishing signals through the gates 72, 74, 76 and 78 to the coils 34$x$ and 34$y$, respectively (FIGURE 2B); and we invert the output pulses produced by excursion of the electron stream along one-half of its sweep pattern and apply said inverted pulses and the non-inverted pulses produced by excursion of the electron stream along the diametrically opposite half of its sweep pattern to integrators. When the steady state axis of the electron stream emitted by the photo cathode of tube 10 is properly centered with regard to aperture 22 of image dissector plate 20 along the line determined by said opposite excursion of the electron stream, the output pulses fed to the integrator cancel each other out and the integrator produces no output, but if the steady state axis of the electron stream departs from a properly centered position, the current pulses delivered to the integrator as the electron stream sweeps along diametrically opposite paths of its deflection pattern differ in duration, and when these output pulses are delivered to an integrator after one set of pulses has been inverted, the integrator produces an output whose size and polarity represent the degree and the direction of the eccentricity of the axis of the electron stream with respect to the center point of the aperture in the image dissector plate 20. Any such integrator output then represents the degree, and the direction, of any departure of the optical center axis of the instrument from its predetermined position relative to the reference target.

Having reference to FIGURE 2C, the output of the image dissector tube 10 is passed through the repeatedly mentioned amplifier 52 and applied directly to gates 112 and 116. The operation of both said gates is controlled from the pulse distributing network 80 as indicated by the lines 113 and 117, respectively. Gate 112 receives a pulse from said distribution network (and is therefore in condition to pass output pulses received from amplifier 52) whenever the distributing network opens gate 72 (FIGURE 2B) to pass the first triangular wave of each group of four such waves to the coils 34$x$ (which cause the electron stream to sweep along path $a$–$b$–$a$ of FIGURE 3). Hence, any signal appearing in the output line 32 of the image dissector tube during this time interval may pass through gate 112, but during the time of the following three waves applied to the deflection coils, gate 112 is blocked and unable to pass any signal. Similarly, gate 116 receives an unblocking pulse from pulse distributing network 80 at the same time as said network delivers a control pulse to the gate 76 to permit said gate to pass a positive energizing wave to the coils 34*y* (causing deflection of the electron stream along path *a–d–a* of FIGURE 3). Hence, any output of the image dissector tube produced during the upward sweep of the electron stream is channelled through gate 116. Before the output of amplifier 52 is applied to the remaining gates 114 and 118, however, it is inverted in a phase inverter network represented by the block 122. Gate 114 is controlled from distributor network 80 in the same manner as gate 74, as indicated by the line 115. This means that it is conditioned to pass any pulses appearing in the output line 32 of the image dissector tube 10 which are produced during deflection of the electron stream along path *a–c–a* of FIGURE 3. Similarly, gate 118 is controlled from distribution network 80 in the same manner as gate 78, as indicated by line 119, and will therefore pass any signals produced in output line 32 during deflection of the electron stream along path *a–e–a* of FIGURE 3.

In accordance with our invention the output pulses of tube 10 passed by gate 112 and the inverted output pulses of said tube passed by gate 114 are continually delivered to an integrator represented by block 124 in FIGURE 2C, and the output pulses passed by gate 116 and the inverted output pulses passed by gate 118 are continually delivered to another integrator represented by the block 126. In integrator 124 the duration of signal voltage produced when the electron stream sweeps across the image dissector plate 20 to the right along the *x*-axis of aperture 22 and the duration of signal voltage produced when the stream sweeps to the left along the *x*-axis of aperture 22 are subtracted from each other. If the integrator 124 produces no output, this is indicative of the fact that the durations of signal voltage produced during excursion of the electron beam to the right and to the left along the *x*-axis of aperture 22 are equal, and hence the center axis of the electron stream emitted by the photo cathode of tube 10 passes through the center of aperture 22 in the image dissector plate 20. In the direction of the *x*-axis the instrument is therefore in its proper position relative to the distant reference target. If the integrator delivers a positive output, it indicates that it takes longer for the electron stream to reach the edge of aperture 22 in sweeping to the right from its center axis than to the left. Hence, the center axis of the electron stream is displaced to the left from the center point of the aperture of image dissector plate 20 to an extent indicated by the size of the integrator output. Analogically, if the integrator 124 produces a negative output, this indicates that the axis of the electron stream is displaced to the right along the abscissa from the center point of aperture 22.

Similarly, the absence of any output from integrator 126 indicates that the axis of the electron stream is properly centered in the direction of the *y*-axis of aperture 22, and the presence of an output indicates the existence of an eccentricity along said *y*-axis of a size and polarity depending upon the size and polarity of the integrator output.

It should be here noted that the arrangement of the invention is such that it will produce a sizable error output even for every minute departures of the optical center axis of the apparatus from its proper position relative to the reference target. This is due to the use of integrators for comparing the output currents produced by the image dissector tube during travel of the deflected electron stream in diametrically opposite directions, because depending upon the periods of integration, even minute differences between the compared output pulses build up to appreciable values.

Figure 6:
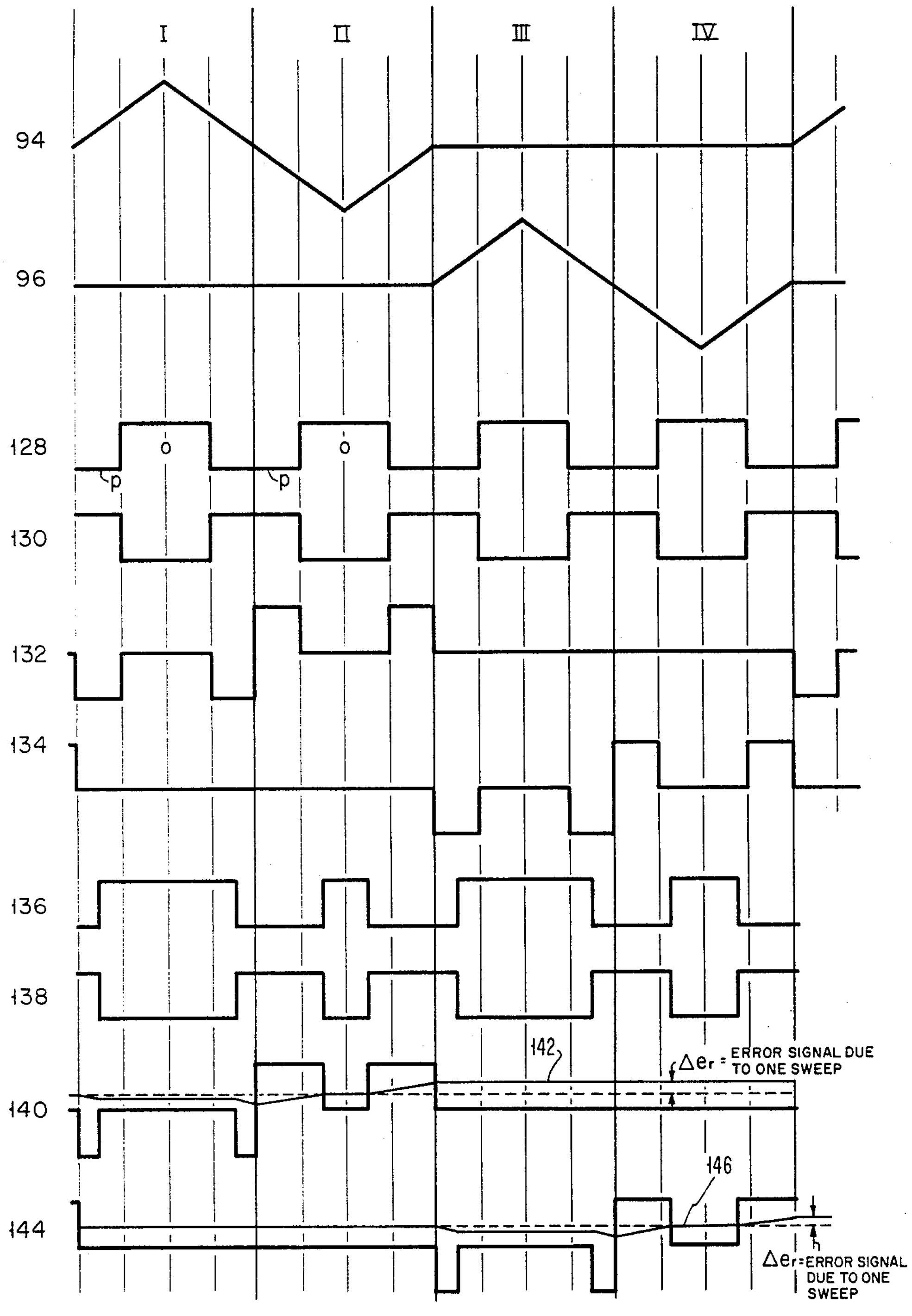
FIGURE 6 illustrates output pulses of the image dissector tube and the manner in which they are processed to indicate whether or not the instrument of the invention departs from its predetermined position relative to a distant energy radiating or reflecting reference point.

Having now reference to FIGURE 6, the uppermost graph 94 represents the composite signal applied to coils 34*x* and the second graph 96 represents the composite signal applied to the coils 34*y* in proper phase relation to graph 94. Both signals mark one full deflection cycle in the tracking operation of the instrument of the invention. The third graph from the top which is identified by the reference numeral 128, represents the total output of the image dissector tube 10 during the time the indicated deflection signals 94 and 96 are applied to the coils 34*x* and 34*y*, respectively. It exemplifies the output of the image dissector tube in a situation wherein the axis of the electron beam emitted by the photo cathode of the tube passes precisely through the center point of aperture 22 in the image dissector plate 20. Hence, the current pulses *p* corresponding to the time required by the electron stream for reaching the edge of aperture 22 in plate 20 from its center position, are of equal duration in all four sectors and so are the periods of no current flow which are identified by the letter *o* and correspond to the times during which the electron stream sweeps over the plate 20 beyond the edge of aperture 20. The fourth graph 130 represents the inverted output of the image dissector tube as it emerges from phase-inverting network 122 (FIGURE 2C). The fifth graph of FIGURE 6, which is identified by the reference numeral 132, represents the composite output of gates 112 and 114 that is applied to the integrator 124 (FIGURE 2C). It comprises the direct output of the image dissector tube 10 during the first wave of each group of four deflection waves applied to its deflection coils and it contains the output of the image dissector tube during the second deflection wave in inverted form. It does not contain the output of the image dissector tube during the third and fourth deflection waves. Since the output pulses obtained during the period of the first deflection wave and the pulses obtained during the second deflection wave are symmetrically identical, i.e. are of equal duration, but opposite polarity, it is obvious that the output of integrator 124 will be zero no matter how long signal 132 (FIGURE 6) is delivered to the integrator, indicating that the axis of the electron stream emitted by the photo cathode is properly centered in the aperture of image dissector plate 20 along the *x*-axis of the Cartesian system.

The sixth graph from the top of FIGURE 6, which is identified by the reference numeral 134, represents the composite output of gates 116 and 118 during one complete cycle in the operation of the apparatus. It consists of the pulses emerging from tube 10 during the time of the third and fourth deflection waves, with the output pulses produced during the fourth deflection wave appearing in inverted condition. As in the case of graph 132, the output pulses appearing during the third and fourth deflection waves are of equal duration but opposite polarity so that they cancel each other in integrator 126 (FIGURE 2C), indicating that the steady state axis of the electron stream emitted by the photo cathode of tube 10 is also properly aligned with the center point of the aperture 22 in the image dissector plate 20 along the *y*-axis of the Cartesian system.

Referring again to FIGURE 6, the seventh graph from the top which is identified by the reference numeral 136, represents an output of the image dissector tube 10 under different circumstances. The pulses in sector I of the graph differ greatly from, and are much shorter in duration than, the pulses in sector II, and similarly the pulses in sector III of the graph are of much shorter duration than the pulses in sector IV of the graph. This means that the axis of the electron stream emitted by the photo cathode of tube 10 and bent into operative relation with the image dissector plate 20 by the constant currents applied to the deflection coils 34*x* and 34*y*, is displaced to the right and upwardly from the center point of aperture 22 in said plate 20. The eighth graph from the top which bears the reference numeral 138, represents the output of inverter stage 122 (FIGURE 2C) and graph 140 of FIGURE 6 directly below graph 138 represents the combined output of gates 112 and 114 which is fed into integrator 124 (FIGURE 2C). In this instance, the positive and negative pulses are of different width and obviously do not balance each other out, and the integrator produces a positive output which increases in size as the integrator interval is increased. In FIGURE 6 this output is represented by the line 142 and indicates that the steady state axis of the electron stream is displaced to the right of the center point of aperture 22, or to put it conversely, that the optical center axis of the instrument departs to the left from its proper position relative to the distant reference target.

Graph 144 of FIGURE 6 represents the combined output of gates 116 and 118, which is supplied to integrator 126 (FIGURE 2C). Again the duration of the negative pulses in sector III of the graph and the duration of the positive pulses in sector IV of the graph is such that the integrator produces a positive output which is represented by the line 146 and which indicates that the steady state axis of the electron stream is displaced in an upward direction from the center point of aperture 20, or to put it conversely, that the optical axis of the instrument departs downwardly from its proper position relative to the distant source of radiation. Even if a departure of the optical axis of the instrument from its predetermined position relative to the reference target is exceedingly small in one or both directions, it is possible with the arrangement of the invention to obtain sizeable error signals by adjusting the integrators to integrate the signals delivered to them over appropriately long intervals of time because the absolute value of the integrator output increases with the length of the integrated time intervals. The error signals thus obtained, therefore, give a clear indication of any departure of the apparatus of the invention or any structure upon which said apparatus may be supported, from a predetermined position of orientation relative to a distant reference target, and may be employed in space vehicles to provide information as to the orientation of such vehicles in space with regard to selected reference targets or to control servo mechanism which changes the position of the vehicle until the steady state axis of the electron stream passes again through the center point of the aperture in the image dissector plate.

Figure 2D:
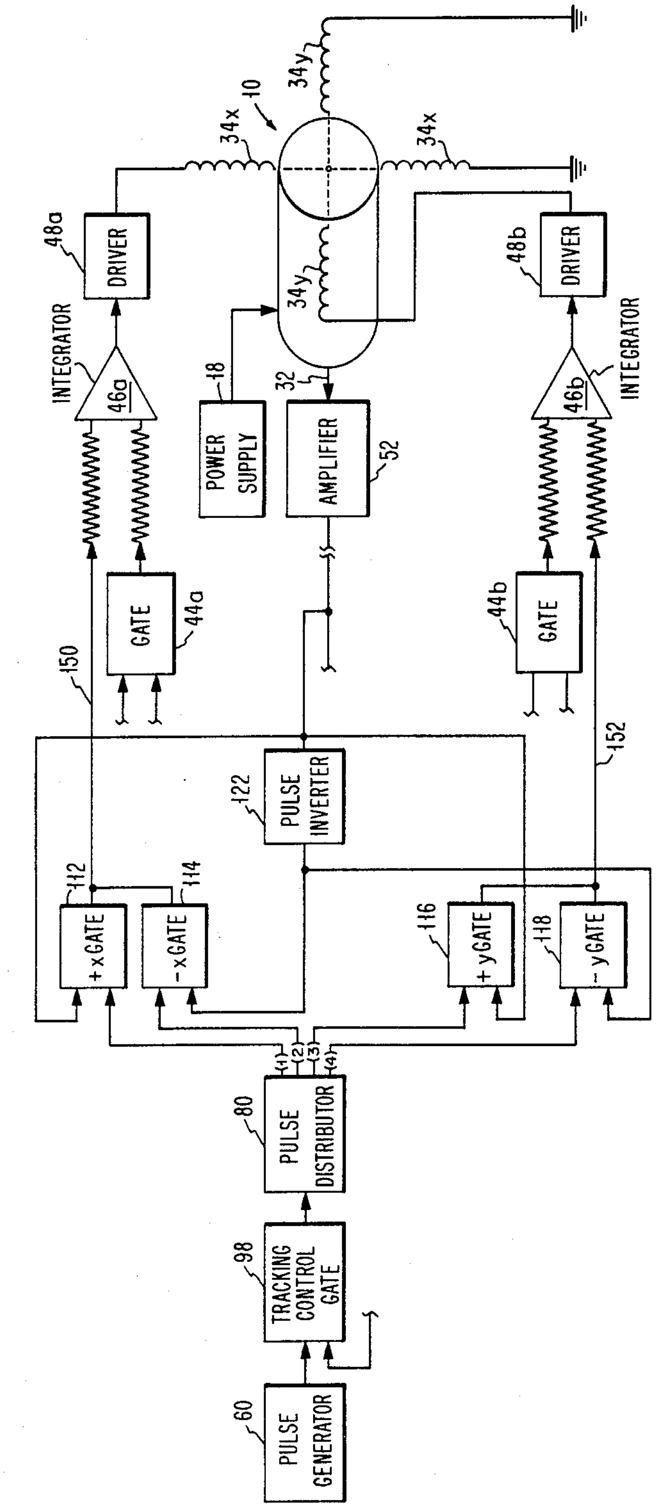

In the particular embodiment of the invention represented by FIGURE 2D, however, the "error" signals developed by the described pulse interpreting arrangement are employed to set up deflection fields that return the electron stream continually to its initially established course wherein it passes through the center point of aperture 22 in the image dissector plate so as to maintain dependably an operative relation between the instrument and the reference target irrespective of changes in the orientation of the instrument and/or the position of the reference target. To this end, the output of gates 112 and 114 may be delivered through a line 150 directly to the initially described integrator **46*a*** which determines the deflection of the electron stream along the *x*-axis of aperture 22 and which now acts as pulse-interpreting device as well; and similarly the output of gates 116 and 118 may be delivered through a line 152 directly to the integrator **46*b*** which determines the deflection of the electron stream along the *y*-axis of aperture 22. Thus, the deflection potentials produced by said integrators are continually varied and in this manner the electron stream is servo-ed to follow the center point of aperture 22 irrespective of changes in the position of the instrument and/or the acquired target. The instrument therefore remains at all times in operative relation with said target, without need to adjust its physical position in space.

Conversely, by applying predetermined voltages to the integrators **46*a* and/or 46*b* through lines 150 and 152**, respectively, the operative orientation of the instrument may effectively be changed at will, and the instrument may be caused to acquire another selected reference target without need to change its physical orientation.

The instrument of the invention is capable of finding any predetermined energy radiating or reflecting reference target within the field of vision of its lens when pointed in the direction of said reference target. It is capable of distinguishing between sources of energy of different magnitude and to choose one of predetermined intensity. It is capable of maintaining operative relation with an acquired reference target, without requiring movements of any kind in spite of changes in its orientation and/or in the position of the target. Formerly it was necessary to employ mechanically operating servo gimbals to maintain these operative relations. It may effectively be pointed to different selected targets without requiring adjustment of its physical position. On space vehicles it may serve to furnish information as to the orientation of the vehicles in space.

The exemplary embodiment of the invention described hereinbefore employs an image dissector tube. The principles of the present invention, however, are equally applicable to apparatus which employ other camera tubes, such as Vidicon tubes and image orthicon tubes. In accordance with the invention apparatus employing Vidicon tubes, image orthicon tubes and other camera tubes may be arranged to acquire radiant or reflected energy targets and to produce outputs that may be analyzed in the same manner and by the same systems as described hereinbefore, to establish and maintain a predetermined relation of a vehicle with a distant source of radiant or reflected energy, to indicate any departures of the vehicle from a predetermined course and to constrain and/or restore the vehicle to such a course.

Figure 7:
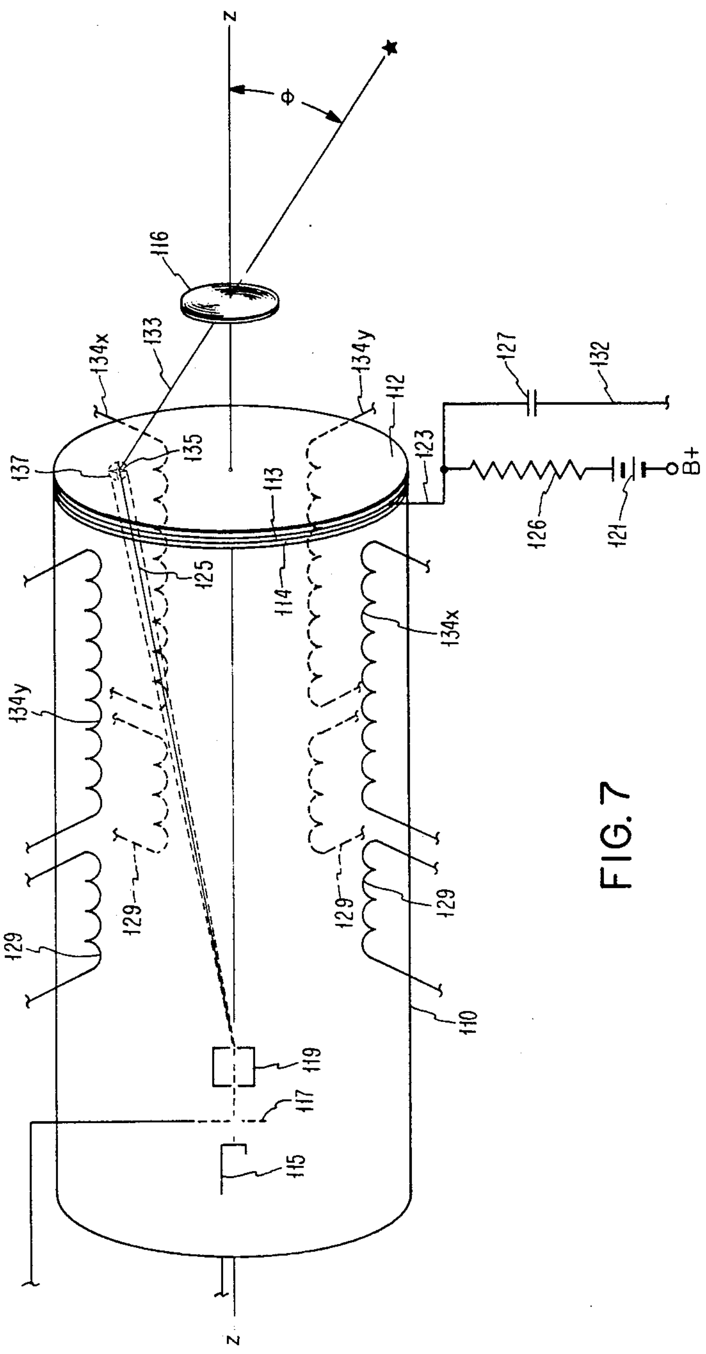
FIGURE 7 is a schematic section, similar to FIGURE 1, of a Vidicon tube which may form part of an apparatus of our invention.

FIG. 7, for instance, illustrates schematically how a Vidicon tube may be arranged to perform in a manner equivalent to the performance of the hereinbefore described image dissector tube, and to produce output pulses which are identical to the output pulses of said image dissector tube and may be processed by the arrangements illustrated in FIGURES 2A, 2B, 2C and/or 2D.

The Vidicon tube shown in FIGURE 7 comprises a cylindrical enclosure 110 having a transparent end wall 112 which carries on its inner face a thin coat or layer 113 of a transparent conductive material, and superimposed thereon a thin layer 114 of a photo-sensitive substance. Located near the opposite end of the enclosure is a cathode 115, a control grid 117, and an accelerating electrode 119 by means of which the electrons emitted by the cathode may be directed against the photo-sensitive layer 114 as indicated by the line 125.

The conductive layer 113 is connected to a source of positive voltage 121 by a line 123, and means are provided in the form of deflection coils **134*x* and 134*y*, or equivalent deflection elements well known in the art, to sweep the electron beam 125 in a desired search pattern across the photo-sensitive layer 114. For instance, deflection currents that sweep the beam in a spiral pattern across the photo-sensitive target 114 may be supplied to the deflection coils 134*x* and 134*y*** from an arrangement such as shown in FIGURE 2A.

As long as the photo-sensitive layer 114 is not exposed to radiant energy (or is uniformly exposed to radiant energy), the flow of electrons from the photo-sensitive layer 114 through the conductive layer 113 to the source of voltage 121 produced as the photo-sensitive layer is swept by the beam of electrons remains substantially uniform. However, when an image of a distant source of radiant or reflected energy, such as a star, is focussed upon the photo-sensitive layer 114 through the end wall 112 and transparent conductive layer 113 by a lens 116, as symbolically represented by the line 133, a variation in the flow of electrons toward the source of positive voltage 121 occurs whenever the electron beam sweeps across the image. Any such variation may be sensed across a resistor 126 provided in line 123, and may be isolated from the current flow in line 123 across a condenser 127 to appear as a pulse in a line 132 which corresponds in all respects to the output line 32 of the image dissector tube shown in FIGURE 1. The appearance of output pulses in line 132 may be employed to arrest the elctron beam 125 in the position wherein it impinges upon the image 135 on photo-sensitive layer 114, in the same manner and by the same means as is employed to arrest the electron stream 35 of the image dissector tube in a position wherein it passes through the center of the aperture 22 in the image dissector plate 20.

By means of suitable focussing elements, such as the coils 129, the electron beam 125 emitted by the cathode 115 of the Vidicon tube is arranged to encompass a larger area upon the photo-sensitive layer 114 than any image 135 focussed by lens 116 upon said layer, as indicated to a greatly exaggerated extent at 137 in FIGURES 7, 8 and 9. By sweeping the electron beam in predetermined patterns across the acquired image, output pulses may be obtained in line 132 that corresponds in all respects to the output pulses appearing in line 32 of the image dissector tube when the electron stream 35 emitted by its photo cathode is swept across the aperture 22 of its image dissector plate (FIGURE 1); and the fluctuations in the currents passed through the deflection coils 134*x* and 134*y* of the Vidicon tube to sweep the electron beam 125 across the acquired image may be the same, and may be derived from the same arrangement as is employed to sweep the electron stream of the image dissector tube across the center aperture of said image dissector plate.

FIGURE 8 illustrates a situation wherein the image 135 of a distant source of radiant or reflected energy is properly centered in the area of electron impingement indicated by the circle 137; and when the electron beam is swept a predetermined distance to the right, as indicated by circle 137′ and back to its steady state position, and then to the left by an equal distance as indicated by the circle 137″ and back to its steady state position, the output pulses produced in line 132 while the electron beam still encompasses the image 135, are of equal duration whether the beam travels to the right or the left as shown below the center circle 137 where the current pulses are drawn along the *y*-axis. This shows that the image lies in the center of the impact field of the electron beam in its steady state position along the *x*-axis of a Cartesian system, and is indicative of the fact that the apparatus adheres to its predetermined relation with the distant source of energy. On the other hand, if the image is off-center as illustrated in FIGURE 9, the periods of time during which the electron beam encompases the image are different when the beam is swept to the left and to the right, and as a result thereof the output pulses appearing in line 132 are of unequal duration in the same manner in which the output pulses in line 32 of the image dissector tube are unequal when the electron stream 35 is swept across the aperture 22 of the image dissector plate while its steady state axis departs from precise concentricity with said aperture.

In the case of both tubes, therefore, the relative duration of the consecutive pulses appearing in output lines 32 and 132, respectively, indicates whether the apparatus maintains a predetermined relation with a distant source of radiant or reflected energy, and if not, in which manner and to which degree it departs from such a predetermined relation; and by inversion of the pulses produced during sweep of the beam on one side of its steady state axis and integration of the inverted and uninverted pulses in accordance with our invention in systems such as illustrated in FIGURES 2C and 2D, unequivocal error signals are obtained that may be employed to indicate the direction and the magnitude of any departure of the vehicle from a predetermined course, or to set into motion mechanical servo-mechanisms that restore the vehicle to its predetermined course (FIGURE 2C). Alternatively, the error signals may be employed to modify the steady state deflection of the electron beam 125 to maintain an operative relation between the apparatus and the distant source of energy (FIGURE 2D) without readjustment in the physical position of the apparatus.

The construction and operation of image orthicon tubes is in many ways similar to the construction and operation of Vidicon tubes, and image orthicon tubes may be arranged in the same manner as described hereinbefore in connection with a Vidicon tube to produce output pulses that can be processed by the above described arrangements of our invention to produce error signals that indicate deparature from a predetermined relation with a distant source of radiant or reflected energy, and which may be used to compensate for such departures by controlling the operation of mechanical servo-mechanisms or by modifying the steady state position of the electron beam employed to discover the departure.

While we have explained our invention with the aid of certain embodiments thereof, it will be understood that the invention is not limited to the special constructional details and circuit components illustrated and described by way of example, which may be departed from without departing from the scope and spirit of the invention.

Wherever in the following claims the term "source of radiant energy" is employed it is intended to include sources of "reflected" energy, and wherever the term "beam" of electrons is employed, it is intended to include "streams" of electrons such as mentioned in the foregoing specification.

We claim:

1. In apparatus for sensing departures from a predetermined relation with a distant source of radiation wherein an electron beam is cyclically swept in opposite directions across a target area to produce electrical output pulses representing the degree and direction of any departure of the apparatus from its predetermined relation with said source of radiation, an interpreting arrangement comprising means for separating the pulses obtained as the beam travels on opposite sides of its steady state axis into two separate sets, and means for comparing the total duration of the resultant two sets of pulses over a predetermined time interval.

2. In apparatus for sensing departures from a predetermined relation with a distant source of radiation wherein an electron beam is cyclically swept in opposite directions across a target area to produce electrical output pulses representing the degree and direction of any departure of the apparatus from its predetermined relation with said source of radiation, an interpreting arrangement comprising means for separating the pulses obtained as the beam travels on opposite sides of its steady state axis into separate sets, means for inverting the pulses of one of said sets, pulse integrating means, and means for delivering the inverted pulses of said one set and the uninverted pulses of the other set to said integrating means to produce error signals.

3. In apparatus for sensing departures from a predetermined relation with a distant source of radiation wherein an electron beam is cyclically swept equal distances in opopsite directions across a target area to produce electrical output pulses representing in terms of relative duration the degree and direction of any departure of the apparatus from its predetermined relation with said source of radiation, an interpreting arrangement comprising means for separating the pulses obtained as the beam travels on opposite sides of its steady state axis into separate sets, means for inverting the pulses of one of said sets, pulse integrating means, and means for delivering the inverted pulses of said one set and the uninverted pulses of the other set to said integrating means to produce error signals indicative of the magnitude and direction of a departure of the apparatus from said predetermined relation.

4. Apparatus for sensing departures from a predetermined relation with a distant source of radiation, comprising a photo-sensitive cathode, means for focussing energy from the distant source upon said cathode, an image dissector plate having an aperture, means for sweeping an electron stream generated by said cathode in response to impingement thereof by energy from said source cyclically in opposite directions from its steady state axis across and beyond said aperture, means operative to produce an output current when the electron stream passes through said aperture, and means for interpreting the resultant current pulses including means for separating the current pulses produced when the stream travels on opposite sides of its steady state position into two separate sets of pulses, and means for comparing the total duration of the resultant two sets of pulses over a predetermined time interval.

5. Apparatus for sensing departures from a predetermined relation with a distant source of radiation, comprising a photo-sensitive cathode, means for focussing energy from the source upon said cathode, an image dissector plate having an aperture, means for sweeping an electron stream generated by said cathode in response to impingement thereof by energy from said source cyclically in opposite directions over equal distances from its steady state axis across and beyond said aperture, means operative to produce an output current when the electron stream passes through said aperture, and means for interpreting the resultant current pulses including means for separating the current pulses produced when the stream travels on opposite sides of its steady state position into separate sets of pulses, means for inverting the pulses of one of said sets, pulse integrating means and means for delivering the inverted pulses of said one set and the uninverted pulses of the other set to said integrating means to produce an integrator output of a size and polarity representative of the magnitude and direction of any departure of the steady state axis of the electron stream from concentricity with said aperture.

6. Apparatus for indicating departure from a predetermined relation with a distant source of radiation comprising a photo-sensitive element, means for focussing energy from the distant source of radiation upon said element, means for passing a current through said element including means generating an electron beam and directing it against said element at the point of energy impingement thereof, and means for detecting departure of said point of energy impingement from alignment with said beam including means for sensing variations in the current flow through said element, means for sweeping the electron beam a limited distance in opposite directions across the point of energy impingement to produce in said sensing means pulses representing degree and direction of departure of said point from alignment with the steady state axis of the electron beam, means for separating said pulses into two separate sets depending upon which side of its steady state axis the beam travels as it produces the pulses, and means for comparing the total duration of the resultant two sets of pulses over a predetermined time interval.

7. Apparatus for indicating departure from a predetermined relation with a distant source of radiation comprising a photo-sensitive element, means for focussing energy from the distant source of radiation upon said elements, means for passing a current through said element including means for generating an electron beam and directing it against said element at the point of energy impingement thereof, and means for detecting departure of said point of energy impingement for alignment with said beam including means for sensing variations in the current flow through said element, means for sweeping the electron beam equal distances from its steady state position in opposite directions across the point of energy impingement to produce in said sensing means pulses representing degree and direction of departure of said point from alignment with the steady state axis of the electron beam, means for separating said pulses into two separate sets depending upon which side of its steady state axis the beam travels as it produces the pulses, means for inverting the pulses of one of said sets, pulse integrating means, and means for delivering the inverted pulses of said one set and the uninverted pulses of the other set to said integrating means to produce an integrator output of a size and polarity representative of the magnitude and direction of a departure of said point of energy impingement from alignment with the steady state axis of said electron beam.

8. Apparatus for establishing an operative relation with a distant source of radiation and indicating departures therefrom comprising a photo-sensitive cathode, an image dissector plate having an aperture, deflection-field-establishing means, initially operative means including a current integrator for supplying such currents to said field-establishing means as cause an electron stream emitted by said cathode in response to impingement by energy from a distant source of radiation to sweep in a search pattern over said plate, initially ineffective means for supplying such currents to said field-establishing means as sweep an electron stream passing through said aperture in a sensing pattern in opposite directions from its center axis across and beyond said aperture, means operative in response to passage of an electron stream through said aperture to produce an output current, means actuated by said output current for inactivating said initially operative current supply means to terminate the search sweep of the stream and cause said integrator to hold the stream in a position wherein it passes through said aperture, means likewise actuated by said output current for activating said initially ineffective current supply means to initiate the sensing sweep of the stream across and beyond said aperture, means for segregating the resultant output current pulses into sets of pulses according to which side of its steady state axis the stream travels as it produces the pulses, pulse inverting means, pulse integrating means, and means for delivering one of said sets of pulses directly and the other through said pulse inverting means to said integrating means to produce an integrator output of a magnitude and polarity representative of the magnitude and direction of a departure from an operative relation between the apparatus and the source of radiation.

9. Apparatus for establishing an operative relation with a distant source of radiation and indicating departures therefrom comprising a photo-sensitive element, means for focussing energy from the source of radaition upon said element, means for passing a current through said element including means for generating an electron beam and deflection-field-generating means for sweeping said beam across said element, means for sensing variations in the current flow through said element as said beam encounters a point thereof upon which energy from the source of radiation is focussed, means effective upon registration of a current variation in said sensing means for maintaining the electron beam in a position wherein it impinges upon said point of energy impingement, and means for detecting departures of said point of energy impingement from alignment with said beam including means for sweeping the electron beam a limited distance in opposite directions across the point of energy impingement to produce in said sensing means pulses representing in terms of relative duration the magnitude and direction of departure of said point of energy impingement from alignment with the steady state axis of said electron beam, means for separating the pulses into two separate sets depending upon which side of its steady state axis the beam travels as it produces said pulses, pulse inverting means, means for delivering the pulses of one of said sets to said pulse inverting means, pulse integrating means, and means for delivering the inverted pulses of said one set and the uninverted pulses of said other set to said pulse integrating means to produce an integrator output of a magnitude and polarity representative of the magnitude and direction of departures of the point of energy impingement from alignment with the steady state axis of said beam.

References Cited by the Examiner

UNITED STATES PATENTS

| | | | |
|---|---|---|---|
| 2,532,063 | 11/1950 | Herbst | 250—203 X |
| 2,662,197 | 12/1953 | LeComte | 315—24 |
| 2,838,602 | 6/1958 | Sprick | 178—15 |
| 2,885,596 | 5/1959 | Kaufmann | 315—24 |
| 3,039,002 | 6/1962 | Guerth | 250—203 |
| 3,043,907 | 7/1962 | Martin | 178—6.8 |
| 3,046,332 | 7/1962 | Engler | 178—6.8 X |
| 3,053,984 | 9/1962 | Hulett | 250—203 |
| 3,114,859 | 12/1963 | Fathauer et al. | 178—7.2 X |
| 3,149,235 | 9/1964 | Clark | 250—203 |

RALPH G. NILSON, *Primary Examiner.*

WALTER STOLWEIN, *Examiner.*